United States Patent

[11] 3,634,140

| [72] | Inventor | Otto Von Krusenstierna<br>Vasteras, Sweden |
| --- | --- | --- |
| [21] | Appl. No. | 857,758 |
| [22] | Filed | Sept. 15, 1969 |
| [45] | Patented | Jan. 11, 1972 |
| [73] | Assignee | Allmanna Svenska Elektriska Aktiebolaget<br>Vasteras, Sweden |
| [32] | Priority | Sept. 20, 1968 |
| [33] | | Sweden |
| [31] | | 12671/68 |

[54] FUEL CELL DEVICE UTILIZING AIR AS OXIDANT
3 Claims, 2 Drawing Figs.

[52] U.S. Cl..................................................... 136/86 B,
136/160
[51] Int. Cl................................................H01m 27/12
[50] Field of Search........................................... 136/86

[56] References Cited
UNITED STATES PATENTS

| 2,070,612 | 2/1937 | Niederreither............... | 136/86 R |
| 3,002,039 | 9/1961 | Bacon........................... | 136/86 B |
| 3,342,641 | 9/1967 | Burhorn et al................ | 136/86 R |
| 3,443,999 | 5/1969 | Fukuda et al................. | 136/86 R |
| 3,457,114 | 7/1969 | Wedin........................... | 136/86 R |

*Primary Examiner*—Allen B. Curtis
*Attorney*—Jennings Bailey, Jr.

ABSTRACT: A fuel cell arrangement includes an electrolyte chamber with a fuel electrode arranged in contact with electrolyte and the fuel of the cell and having an air electrode arranged in contact with the electrolyte and with the atmosphere. The air electrode is formed of two porous layers having different porosity, the layer located nearest the electrolyte side having the finer pores. The electrolyte chamber is connected to a large storage vessel by electrolyte circulating means. The top of the storage vessel and the top of the electrolyte chamber are connected by a valved conduit to an evacuated container, which is also connected by a valved conduit to a suction pump capable of being operated by a battery charged by the output of the fuel cell.

INVENTOR.
OTTO VON KRUSENSTIERNA
BY
Jennings Bailey Jr.

FUEL CELL DEVICE UTILIZING AIR AS OXIDANT

BACKGROUND OF THE INVENTION

1. Field of the Invention

Air is a particularly attractive oxidant for fuel cells. This is, of course, so for all fuel cell systems which operate in a free air milieu, for example traction systems such as cars, locomotives, trucks and stationary systems such as small power stations for telecommunication links, beacons, buoys and automatic weather stations. When air is used as oxidant the difficulty arises, especially for small fuel cell systems, of maintaining the difference in pressure between the air side and the electrolyte side of the air electrode which is necessary so that the pores of the porous electrode will not be completely filled with liquid and the electrode therefore lose practically all activity, without the help of considerable auxiliary power which cannot be permitted in small systems.

2. The Prior Art

Usually the electrode is made hydrophobic, which may be done, for example, by coating the pores with wax or paraffin or by adding polytetrafluoroethylene particles to the powder from which the porous electrode is manufactured. The electrolyte is thereby prevented from penetrating through the electrode out to the atmosphere and the meniscus of the electrolyte assumes a position of equilibrium in the porous electrode. During long operating times, however, difficulties often arise since the effect of the hydrophobic substance decreases due to coatings which are formed, chemical reactions, etc., so that the electrode is finally completely filled with the electrolyte. This ageing phenomenon has been found to be particularly pronounced with the use of fuel, for example methanol, dissolved in the electrolyte, since the surface tension is then especially reduced. An undesirable effect is also obtained since the hydrophobic material partly screens off the catalyst surface. The use of polytetrafluoroethylene as hydrophobic material also means that a low sintering temperature must be used when the electrode is manufactured, which in turn means that the desired mechanical strength of the electrode cannot be achieved.

The required difference in pressure between the two sides of the air electrode can also be maintained by pressing a capilliary active membrane against the electrode on the electrolyte side. Such a membrane may consists, for example, of asbestos or some other porous material having extremely fine pores. In this way the electrolyte is prevented by "blotting paper effect" from penetrating through the electrode. Even in this case the capilliary active effect may decrease with long operating times for the same reasons as those given for the hydrophobic electrodes. The disadvantage also arises with fuel cells having circulating electrolyte that the electrolyte resistance increases strongly so that the flow of the electrolyte through the electrolyte chamber is greatly impeded.

SUMMARY OF THE INVENTION

The present invention aims at effecting a fuel cell system which is self-sufficient as far as its energy requirements are concerned for a considerable time and which can operate for a long time without unfavorable alterations taking place in the electrodes.

The present invention relates to a fuel cell device comprising at least one fuel cell having a fluid electrolyte arranged in an electrolyte chamber, a fuel electrode arranged in contact with the electrolyte and with the fuel of the fuel cell and an air electrode arranged in contact with the electrolyte and with the air atmosphere, the air electrode having one side facing the air atmosphere and one side facing the electrolyte and comprising at least two porous layers having different porosity, the layer situated nearest the electrolyte side having finer pores than the layer situated nearest the air atmosphere side, characterized in that the electrolyte chamber is connected by an openable and closable conduit to an evacuated container in which a pressure lower than atmospheric pressure is maintained by means of an evacuating pump connected to the container by an openable and closable conduit, the pump being arranged to be operated intermittently by electric energy generated in the fuel cell, and that the electrolyte is arranged in an electrolyte circuit containing a storage vessel with electrolyte having a great volume in relation to that of the electrolyte chamber.

The difference in pressure between the air atmosphere side and the electrolyte side necessary for the functioning of the electrode can be maintained for a very long time, for example the time between two operations for supplying fuel using fuel dissolved in the electrolyte if the evacuated container is made very large in relation to the quantity of gas entering into the electrolyte chamber from outside.

The intermittent operation of the evacuating pump means that only a very small part of the electric energy generated in the fuel cell is used to maintain the different pressures. The container can be evacuated during operation of the fuel cell since it is connected to the fuel cell by an openable and closable conduit.

As the electrolyte is arranged in an electrolyte circuit containing a storage vessel with electrolyte, a desired renewal of the electrolyte in the fuel cell can be effected by circulation of the electrolyte in the circuit. This is important particularly for fuel cells with fuel dissolved in the electrolyte because the quantities of electrolyte and fuel can be so large that fresh fuel does not need to be supplied until after a long time of operation.

In the layer of the air electrode which is situated on the air atmosphere side, that is the layer with the larger pores, the average pore diameter is so large, preferably 10–100 $\mu$, that a relatively low difference in pressure can be used as the optimal operating pressure, for example 0.05–0.6 atm. and preferably 0.1–0.4 atm. In the layer facing the electrolyte, that is the layer with the finer pores, the diameter of the largest pores is preferably 1–30 $\mu$. By making the latter layer with a thickness of at least 0.2 mm. and a largest pore diameter which is smaller than the average pore diameter of the active layer, the risk of air bubbling through to the electrolyte is practically nonexistent at reasonable differences in pressure.

If a gaseous fuel, for example pure hydrogen gas or a gas mixture containing hydrogen gas and, in addition, for example nitrogen gas or carbon dioxide are added to the fuel electrode, this is also given two porous layers, one facing the fuel side and provided with larger pores and the other facing the electrolyte side and provided with finer pores. For these two layers pore diameters and thickness are chosen in accordance with what has been stated for the corresponding layers in the air electrode.

If a fuel dissolved in the electrolyte is used the fuel electrode need not, of course, consist of two layers. It is then suitably porous and consists preferably of only one layer. As examples of suitable fuels which can be used dissolved in the preferably alkaline electrolyte may be mentioned, among others methanol, other low monofunctional alcohols, glycol, formic acid or a formate and hydrazine. Methanol and formic acid or a formate are particularly preferred for economic and practical reasons.

The electrolyte preferably consists of an alkali hydroxide such as a water solution of potassium hydroxide containing 1–35 percent by weight of the hydroxide.

BRIEF DESCRIPTION OF THE DRAWINGS

The invention will be further described in the following by describing examples with reference to the accompanying drawings in which.

DESCRIPTION OF THE PREFERRED EMBODIMENTS

Figure 1:
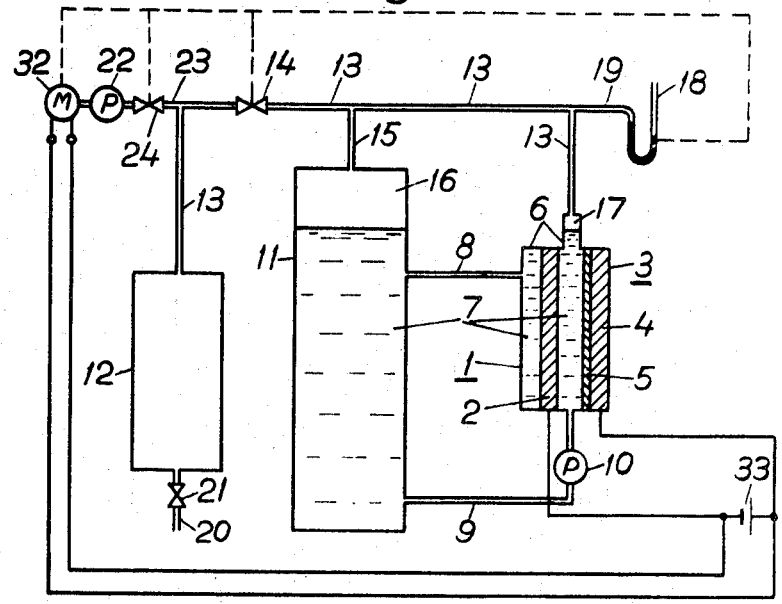
FIG. 1 shows a device according to the invention with fuel dissolved in the electrolyte and FIG. 2 a device according to the invention with gaseous fuel.

The fuel cell 1 according to FIG. 1 has a fuel electrode 2 and an air electrode 3. The fuel electrode 2 consists of a porous plate of nickel particles sintered together. On the electrode and in its pores, which have an average diameter of 10 $\mu$, is a coating consisting of a mixture of palladium, platinum and ruthenium. The platinum metals may be applied in a quantity of 0.01–5, for example 0.5 percent of the weight of the electrode. The thickness of the plate is about 1.5 mm.

The air electrode 3 consists of an active layer 4 for the electrode reaction, having larger pores and an inactive layer 5 with smaller pores. The active layer 4 consists of a mixture of silver and nickel particles sintered together, in which the silver comprises 40 percent by weight and the nickel 60 percent by weight. The average diameter of the pores is about 35 $\mu$ and the thickness of the layer is about 1.5 mm. The inactive layer 5 consists of nickel particles which have been compressed and the sintered on the layer 4. The diameter of the largest pores in this layer is about 10 $\mu$ and the thickness of the layer is about 0.4 mm.

The electrolyte 7 arranged in the electrolyte chamber 6 consists of a water solution of potassium hydroxide containing 20–25 percent by weight KOH. The electrolyte is also provided with methanol or formic acid, which forms the fuel of the fuel cell, in a percentage of 10 percent calculated on the total weight of water, potassium hydroxide and methanol. The electrolyte on both sides of the fuel electrode 2 is in contact through the pores of the electrode.

The air electrode is in contact with the air atmosphere outside the layer 4.

The electrolyte chamber 6 is in communication through the conduits 8 and 9, the latter containing a pump 10, with a storage vessel 11 containing electrolyte and methanol or formic acid dissolved therein. With the help of the pump the electrolyte can be circulated in the closed circuit thus formed. By making the volume of the storage vessel large in relation to the volume of the electrolyte chamber, the fuel cell can be kept in operation for a long time without renewal of the electrolyte or supply of fresh fuel.

The electrolyte chamber 6 is connected to the evacuated container 12 by the conduit 13 containing the openable and closable valve 14. The gas chamber 16 above the liquid in the storage vessel 11 is in communication through the conduits 15 and 13 with the gas chamber 17 above the liquid in the electrolyte chamber 6. The difference in pressure over the air electrode 3 can be read on the pressure gauge 18 which is connected to the conduit 13 by the conduit 19. The container 12 is provided at the bottom with a conduit 20 containing a valve 21 for removal of condensed products which may be formed.

The container 12 can be evacuated to a pressure corresponding to vapor pressure above the electrolyte by the pump 22 which is in connection with the conduit 13 through the conduit 23 with the openable and closable valve 24. The pump is driven by utilizing energy generated in the fuel cell. For this reason the driving means of the pump, a motor 32, is connected to an accumulator battery 33 which is charged by the fuel cell. When the evacuation is finished, the valve 24 is closed and the valve 14 opened, if it has not already been opened during the latter part of the evacuation. The pressure in the container 12, the electrolyte chamber 6 and the container is therefore equalized. If the container 12 is given a large volume in relation to the gas chamber in the electrolyte chamber 6 the fuel cell may operate for a long time before a new evacuation is necessary. Such an evacuation of the container 12 may take place not only in connection with exchanging the electrolyte and fuel, but also during operation.

If the pressure gauge 18 is arranged in an electric control circuit in such a way that at a certain pressure in the electrolyte chamber a signal is emitted to the driving means 32 of the vacuum pump 22 and to the valve 24 so that the pump 22 is started and the valve 24 opened at this pressure and the pump 22 stopped and the valve 24 closed when the required underpressure has been achieved, the complete device according to the drawings can be made to operate under self-regulation. The signal from the pressure gauge 18 is also arranged to influence the valve 14 so that this is closed at the first-mentioned pressure and reopened when the container has been evacuated.

Figure 2:
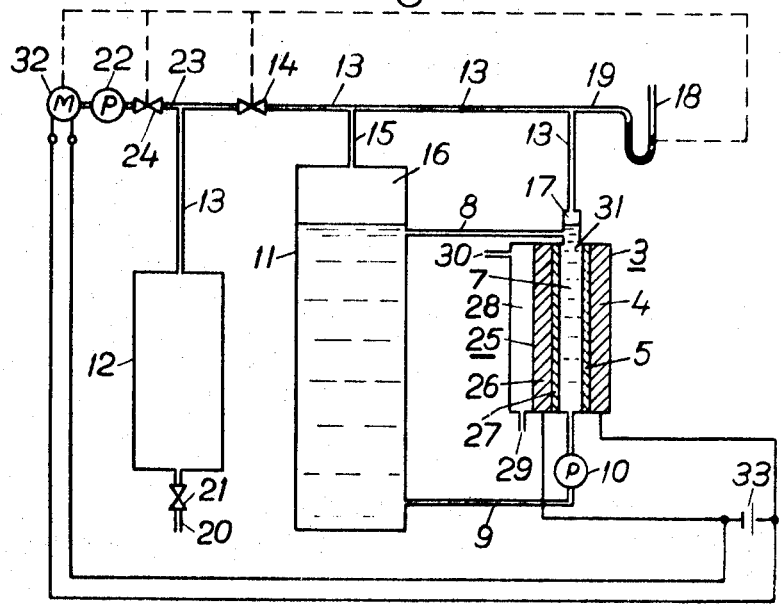

In the device according to FIG. 2 the fuel electrode 25 consists of a porous layer 26 of the same material as the fuel electrode 2 and having the same pore structure as the layer 4 in the device according to FIG. 1. On this layer is arranged a layer with finer pores 27. This layer is of the same type as the layer 5 on the air electrode according to FIG. 1. Outside the fuel electrode is a gas chamber 28 which is supplied with a gaseous fuel at atmospheric pressure, for example hydrogen gas, from a container not shown in the drawings, through the inlet 29. Unconsumed gas at the fuel electrode leaves through the outlet 30. The electrolyte chamber 31 is in its entirety situated between the fuel electrode 25 and the air electrode 3. Evacuation of the container 12 is carried out in the same way as has been described for the device according to FIG. 1, as also the achievement of the required difference pressure over the two electrodes.

Instead of nickel for the active layers 2 and 26, respectively, of the fuel electrode, other metals such as cobalt and iron activated with platinum metals may be used, or for instance, Raney metals such as Raney cobalt and Raney nickel, in which case the electrode material usually contains a carrier material such as nickel or cobalt.

Instead of the mixture of nickel and silver in the active layer 4 of the air electrode, silver, platinum, palladium, platinum-plated carbon or manganese dioxide, among other things, may be used.

The inactive layers 5 and 27 may, besides the exemplified material, consist of ceramic material such as aluminum oxide, aluminum silicate, zirconium oxide and thorium oxide.

I claim:

1. Fuel cell device comprising at least one fuel cell having a fluid electrolyte arranged in an electrolyte chamber, a fuel electrode arranged in contact with the electrolyte and with the fuel of the fuel cell and an air electrode arranged in contact with the electrolyte and with the atmosphere, the air electrode having one side facing the atmosphere and one side facing the electrolyte and comprising at least two porous layers having different porosity, the layer situated nearest the electrolyte side having finer pores than the layer situated nearest the atmosphere side, the improvement which comprises a container, a first openable and closable conduit means connecting the electrolyte chamber to the container, an evacuating pump, a second openable and closable conduit means connecting the evacuating pump to the container, means connected to the electrical output of the fuel cell for operating the pump including means responsive to the pressure in the electrolyte chamber to produce operation of the evacuating pump when such pressure exceeds a predetermined value, and an electrolyte storage vessel having a volume substantially greater then the volume of said electrolyte chamber, and third conduit means connecting the storage vessel and the electrolyte chamber and including means to transfer electrolyte therebetween.

2. Fuel cell device as claimed in claim 1, having means connecting the top of said storage vessel to the top of the fuel cell.

3. Fuel cell device as claimed in claim 1, for operation with gaseous fuel, in which the fuel electrode has one side facing the fuel and one side facing the electrolyte and the fuel electrode comprises at least two porous layers with different porosity, the layer situated nearest the electrolyte side having finer pores than the layer situated nearest the fuel side.

* * * * *